United States Patent
Periyalwar et al.

(10) Patent No.: US 7,962,095 B2
(45) Date of Patent: Jun. 14, 2011

(54) RELAYING SYSTEM AND METHOD WITH PARTNER RELAYS AND SELECTIVE TRANSMISSION

(75) Inventors: Shalini Periyalwar, Nepean (CA); Koon Hoo Teo, Nepean (CA); Mo-Han Fong, L'Original (CA); David Falconer, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 2036 days.

(21) Appl. No.: 10/813,009

(22) Filed: Mar. 31, 2004

(65) Prior Publication Data

US 2005/0221755 A1    Oct. 6, 2005

(51) Int. Cl.
*H04B 7/15* (2006.01)
*H04B 7/185* (2006.01)
*H04B 7/14* (2006.01)

(52) U.S. Cl. .................. 455/22; 455/11.1; 455/13.1

(58) Field of Classification Search .............. 455/11.1, 455/13.1, 15, 22, 7, 20
See application file for complete search history.

(56) References Cited

U.S. PATENT DOCUMENTS

| | | | |
|---|---|---|---|
| 5,883,884 A * | 3/1999 | Atkinson | 370/279 |
| 6,125,109 A * | 9/2000 | Fuerter | 370/315 |
| 6,400,925 B1 * | 6/2002 | Tirabassi et al. | 455/12.1 |
| 6,895,218 B2 * | 5/2005 | Yarkosky | 455/20 |
| 6,985,716 B2 * | 1/2006 | Talaie et al. | 455/403 |
| 7,031,655 B2 * | 4/2006 | Nomura et al. | 455/7 |
| 7,043,195 B2 * | 5/2006 | Bunton et al. | 455/11.1 |
| 2003/0220075 A1 * | 11/2003 | Baker et al. | 455/17 |
| 2004/0033796 A1 * | 2/2004 | Remy | 455/404.2 |
| 2005/0130589 A1 * | 6/2005 | Weissman | 455/11.1 |

OTHER PUBLICATIONS

A New Generation of High-Power Cellular Repeaters Ronald J. Jakubowski The Antenna Specialists Company, Cleveland, Ohio pp. 24-28.

Designing and Simulating a PCS Band CDMA Cellular Network Repeater Alexander Lackpour Pennsylvania State University, Department of Electrical Engineering EE 596: Independent Study Final Report, Spring 2002 pp. 1-18.

* cited by examiner

*Primary Examiner* — Andrew Wendell (57) ABSTRACT

Partner relay systems and methods are provided in which relaying is performed by a pair of partner relays. Signals received from a base station are translated by a first of the pair of partner relays to a different transmission resource for communication between the pair of partner relays, and then upon reception by a second of the pair of partner relays, the signal is translated back to the original transmission resource and re-transmitted towards the receiver.

14 Claims, 7 Drawing Sheets

RELAYING SYSTEM AND METHOD WITH PARTNER RELAYS AND SELECTIVE TRANSMISSION

FIELD OF THE INVENTION

The invention relates to wireless signal repeaters, for example for use in providing coverage enhancement in frequency division duplex (FDD) cellular systems.

BACKGROUND OF THE INVENTION

Analog on-channel repeaters have been used to provide coverage enhancement in FDD cellular systems. Simple analog repeaters require considerable isolation between the transmit and receive antennas, for example >120 dB. In order to achieve the required isolation, the transmitting and receiving antennas are typically isolated, either by separating them by a large distance (with connections established by cabling) or by using elaborate shielding measures.

Conventional analog repeaters are used in order to provide coverage in areas where there would otherwise be a "coverage hole" in a normal area of coverage of the cell. Isolation of the transmit and receiving antennas is particularly difficult to achieve if the coverage holes are outdoors.

State-of-the-art interference cancellation can also be employed and this provides about 30dB reduction in the amount of isolation required between the transmitting and receiving antennas. Isolation of antennas may be easier to achieve if the coverage to be provided is indoors.

All these techniques are expensive, and require careful design and planning in each and every installation.

Typically, the use of relays is limited in current cellular systems, with the primary intent of extending coverage beyond the cell boundary or for eliminating "dead spots" in the cell. A network of cells may selectively employ one or more strategically placed relays.

Figure 1:
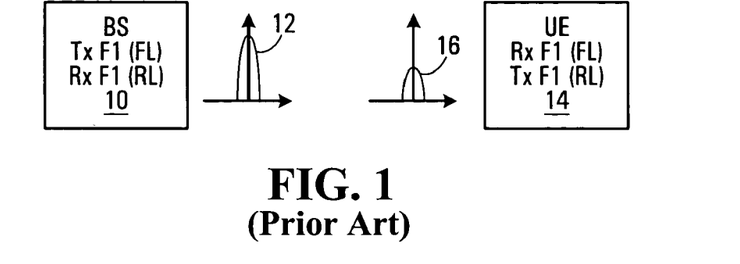
FIG. 1 is a block diagram of a conventional cellular communications system.

Normal transmission without relays is summarized in FIG. 1 for cellular communications system. Shown is a BS (base station) 10 which generates transmit signal 12 which is transmitted over a wireless channel to a UE (user equipment) 14 where it is received as signal 16. The signal level drops between the signal's transmission by the BS 10 and its reception by the UE 14. The BS 10 has a coverage area, or cell, defined by an area of acceptable signal strength.

This example assumes a single carrier operation. The forward link, the base station transmits with frequency F1 (FL) and this frequency is received at the UE 14. On the reverse link, the UE 14 transmits with frequency F1 (RL) which is then received by the BS 10.

Figure 2:
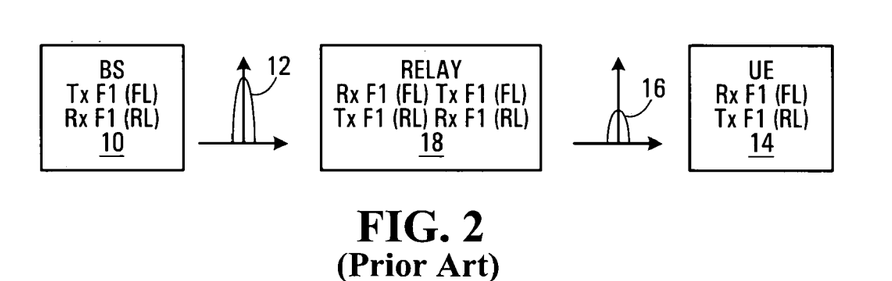
FIG. 2 is a block diagram of a conventional on-channel analog relay scheme applied to the cellular communications system of FIG. 1.

Referring now to FIG. 2, shown as an example of a conventional on-channel analog relay scheme applied to the cellular communications example of FIG. 1. Between the BS 10 and the UE 14 is shown a relay 18. On the forward link, the relay 18 receives a signal transmitted by the BS 10 on F1 (FL) and relays this on to the UE 14 on the same forward link frequency F1 (FL). Similarly, on the reverse link, the relay 18 receives the reverse link transmission of the UE 14 on F1 (RL) and transmits this on to the BS 10 on the same reverse link frequency F1 (RL). The relay scheme of FIG. 2 suffers from the various drawbacks and complications discussed above.

The use of a single frequency translating relays is also known. One of the two frequencies used between the BS and the relay or between the relay and the UE is obtained from outside the cellular spectrum (e.g., microwave frequency between BS and relay and cellular frequency between relay and UE). This implies additional licensing cost to the operator. Even if cellular frequencies are used between the BS and relay and between the relay and UE, a UE has to perform handoff in migrating from the frequency it was using to communicate with the BS, to that of the relay.

SUMMARY OF THE INVENTION

According to one broad aspect, the invention provides a partner relay system comprising: a first relay adapted to receive a first signal on a first wireless transmission resource, perform a first signal translation on the first signal to a second transmission resource, and re-transmit the first signal on the second wireless transmission resource; a second relay in a spaced arrangement from said first relay adapted to receive the first signal on the second wireless transmission resource from the first relay, perform a second signal translation to re-translate the first signal to the first wireless transmission resource, and re-transmit the first signal.

In some embodiments, each signal translation is an analog translation.

In some embodiments, each signal translation is a frequency translation.

In some embodiments, the first signal is a CDMA signal.

In some embodiments, the first wireless transmission resource comprises a first forward link channel on a first carrier frequency, and the second wireless transmission resource comprises a second forward link channel on a second carrier frequency.

In some embodiments, the first signal on the first wireless transmission resource comprises a CDMA signal on a first carrier frequency, and the first signal on the second wireless transmission resource comprises a CDMA signal on a second carrier frequency.

In some embodiments, a cellular communication system for servicing a wireless station, the cellular communication system comprises a base station and the partner relay system as summarized above; wherein the first signal is transmitted by the base station, and the second relay re-transmits the first signal for reception by the wireless station.

In some embodiments, the first wireless transmission resource comprises a forward link channel on a first carrier frequency, and the second wireless transmission resource comprises a reverse link channel on the first carrier frequency.

In some embodiments, the first wireless transmission resource comprises a first combined TDM/FDM resource, and the second wireless transmission resource comprises a second combined TDM/FDM resource.

In some embodiments, a partner relay system is used in a cellular communications system providing service to a wireless station, wherein the first relay comprises a first antenna for communicating with the cellular communications system, and a second directional antenna for communicating with the second relay, and wherein the second relay comprises a third directional antenna for communicating with the first relay, and a fourth antenna for communicating with the wireless station.

In some embodiments, the second relay is further adapted to receive a second signal on a third wireless transmission resource, perform a third signal translation to translate the second signal to a fourth wireless transmission resource and re-transmit the second signal; the first relay is further adapted to receive the second signal on the fourth wireless transmission resource from the second relay, perform a fourth signal translation to re-translate the second signal to the third wireless transmission resource, and re-transmit the second signal.

In some embodiments, the first wireless transmission resource comprises a first forward link channel on a first carrier frequency, and the second wireless transmission resource comprises a second forward link channel on a second carrier frequency, and the third wireless transmission resource comprises a first reverse link channel on the first carrier frequency, and the fourth wireless transmission resource comprises a second reverse link channel on the second carrier frequency.

In some embodiments, a partner relay system for relaying signals between a first transceiver and a second transceiver and relaying signals between first transceiver and a third transceiver; wherein said first signal is from the first transceiver to the second transceiver and is relayed via the first relay and then the second relay, said second signal is from the second transceiver to the first transceiver is relayed via the second relay and then the first relay; wherein a third signal from the first transceiver to the third transceiver is relayed via the second relay and then the first relay, and a fourth signal from the third transceiver to the first transceiver is relayed via the first relay and then the second relay; wherein each signal transmitted between the first relay and the second relay is subject to signal translation prior to transmission by one of the relays and signal translation after reception by the other of the two relays.

In some embodiments, said first and second signals are transmitted and relayed during first time slots, and said third and fourth signals are transmitted and relayed during second time slots.

In some embodiments, the first wireless transmission resource is at least part of a first frequency band, the second wireless transmission resource is at least part of a second frequency band, the third wireless transmission resource is at least part of a third frequency band, and the fourth wireless transmission resource is at least part of a fourth frequency band.

In some embodiments, each wireless transmission resource comprises at least one GSM channel.

In some embodiments, a cellular communication system for servicing at least two wireless stations, the cellular communication system comprises a base station and the partner relay system as summarized above, wherein the first transceiver comprises the base station, and the second and third transceivers are wireless stations.

In some embodiments, the first wireless transmission resource comprises a first combined TDM/FDM resource, and the second wireless transmission resource comprises a second combined TDM/FDM resource, the third wireless transmission resource comprises a third combined TDM/FDM resource, and the fourth wireless transmission resource comprises a fourth combined TDM/FDM resource.

In some embodiments, a partner relay system further comprises: a third relay adapted to receive a second signal on a third wireless transmission resource, perform a third signal translation to translate the second signal to a fourth wireless transmission resource and re-transmit the second signal; a fourth relay further adapted to receive the second signal on the fourth wireless transmission resource from the third relay, perform a fourth signal translation to re-translate the second signal to the third wireless transmission resource, and re-transmit the second signal.

In some embodiments, the first wireless transmission resource comprises a first combined TDM/FDM resource, and the second wireless transmission resource comprises a second combined TDM/FDM resource, the third wireless transmission resource comprises a third combined TDM/FDM resource, and the fourth wireless transmission resource comprises a fourth combined TDM/FDM resource.

In some embodiments, a partner relay system further comprises: a third relay adapted to receive a second signal on the second wireless transmission resource, perform a third signal translation to translate the second signal to the first wireless transmission resource and re-transmit the second signal; a fourth relay adapted to receive the second signal on the first wireless transmission resource from the third relay, perform a fourth signal translation to re-translate the second signal to the second wireless transmission resource, and re-transmit the second signal.

According to another broad aspect, the invention provides a method of relaying a signal comprising: receiving a first signal on a first wireless transmission resource; performing a first signal translation on the first signal to a second transmission resource and re-transmitting the first signal on the second wireless transmission resource; receiving the first signal on the second wireless transmission resource; performing a second signal translation to re-translate the first signal to the first wireless transmission resource and re-transmitting the first signal.

In some embodiments, a method further comprises: receiving a second signal on a third wireless transmission resource; performing a third signal translation to translate the second signal to a fourth wireless transmission resource and re-transmitting the second signal; receiving the second signal on the fourth wireless transmission resource; performing a fourth signal translation to re-translate the second signal to the third wireless transmission resource and re-transmit the second signal.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Relays in high data rate cellular systems may be used to improve high data coverage within the cell, where the signal strength is adequate for communications but not sufficient to deliver high data rates. In such a scenario, a number of low cost, low power, small sized relays may be employed within the cell. Thus a network may then have cellular base stations supplemented with simple low cost relays in all the cells so as to provide higher data rates over the range of the cell. The deployment of tens of relays in the network may be simplified by introducing a wireless solution to support the need for isolation between antennas in the on-channel relay.

Typically the control channel information is transmitted using a lower modulation, for example 4 QAM (quadrature amplitude modulation), whereas it is advantageous to transmit the data slots using a higher modulation, for example 64 QAM, to increase throughput. In such an application, it is likely that the control channel on 4 QAM will be acceptably received within the entire coverage area of the cell due to the low modulation. However, there may be holes in the cell where the 64 QAM does not perform well. In conventional systems, to deal with this a lower modulation was used for such users. Embodiments of the invention allow the full rate coverage to be provided within an entire cell including areas where the high modulation rate coverage would not otherwise be available.

The basis of the partner relay scheme provided by some embodiments of the invention involves frequency translation between the relays as detailed below. The solution addresses the need to conserve channels and bandwith, which may minimize spectrum costs to the operator. The efficient solution may also allow leveraging bandwidth within the cellular spectrum.

Figure 3:
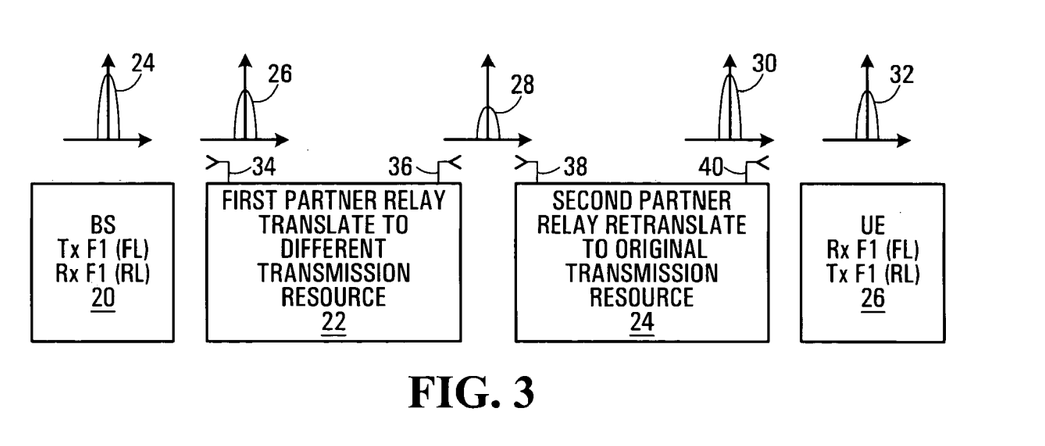
FIG. 3 is a block diagram of a first relaying system and method with partner relays provided by an embodiment of the invention.

Referring now to FIG. 3, shown is a block diagram of a simple communications system in which partner relaying is provided in accordance with an embodiment of the invention. Shown is a BS 20 which is trying to communicate with a UE 26. To achieve this a pair of partner relays 22, 24 are employed which will hereinafter be referred to as a first partner relay 22 and a second partner relay 24. More generally, the arrangement of FIG. 3 can be used to provide communications between any transmitter, a base station being one example, and any receiver, a UE being one example.

The first partner relay 22 has a first antenna 34, which is receiving and transmitting signals from and to the BS 20. It has a second antenna 36 which transmits and receives signals to and from the second partner relay 24. Similarly, the second partner relay 24 has an antenna 38 for communicating with partner relay 22, and has an antenna 40 for communicating bi-directionally with UE 26. In a preferred embodiment, each pair of antennas of each partner relay 22, 24 is a pair of directional antennas. However, more generally, any suitable antenna scheme allowing communication both with the BS or UE and the other relay of the pair of partner relays may be employed. In the event the BS and UE communicate using a MIMO scheme (Multiple Input Multiple Output) using multiple antennas, the same number of antennas would need to be employed in the partner relays.

Transmission resources are split between forward link and reverse link, assuming both are present, using FDD. In the illustrated example, the transmission resource for the downlink is represented abstractly by F1 (FL) and the transmission resource for the uplink is represented abstractly by F1 (RL). These can be any appropriate FDD resources. They might be two channels on a single carrier, two channels on a separate carrier, two wideband signals on one or two carriers, to name a few specific examples.

In an example implementation, the partner relays of the relay pair are separated a distance suitable to achieve a good signal isolation. For example they might be separated by 50-100 meters. However, more generally, any suitable separation between these relays can be employed. Operation of the relay pair for forward link transmission will now be described. A signal 24 is transmitted by BS 20 on a first transmission resource and received as signal 26 with reduced amplitude through antenna 34 at the first partner relay 22. Relay 22 then translates the received signal to a different transmission resource and transmits this as signal 28 on antenna 36 towards the second partner relay. The second partner relay 24 receives the signal on the different transmission resource through antenna 38 and retranslates the signal back to the original transmission resource before transmitting it as signal 30 on antenna 40 towards the UE 26 where it is received as signal 32. The partner relays 22,24 communicate with each other using a different transmission resource than was used for the original BS to UE communications. Similar processing is performed on the uplink to deliver signals from the UE 26 to BS 20 in the event bi-directional communications are required.

This approach mitigates at least some of the disadvantages of the conventional relay scheme. To begin, there is good separation between the antenna 34 of the first partner relay 22 and antenna 40 which retransmits signals received on antenna 34 in the second partner relay 24. Since these antennas are separated by a good distance, the isolation problems do not arise. On the other hand, within a given partner relay, for example the first partner relay 22, the two antennas 34,36 do not need to be separated by a great distance because they are operating using different transmission resources. Thus, the signals output by antenna 34 do not need to be isolated from those received by antenna 36 or vice versa.

In some embodiments, to further minimize interference between the various signals, the communications between the partner relays, for example between antenna 36 and antenna 38 in the example of FIG. 3 are transmitted using a polarization which is orthogonal to that used for the regular BS to UE communications. Thus, in this embodiment the transmissions between the BS 20 and antenna 34 have a first polarization, transmissions between antenna 36 of relay 22 and antenna 38 of relay 24 have a second polarization orthogonal to the first polarization, and then transmissions between antenna 40 of the second relay and the UE 26 have the first polarization again.

Various detailed embodiments will now be described in which specific transmission resources are employed.

Figure 4:
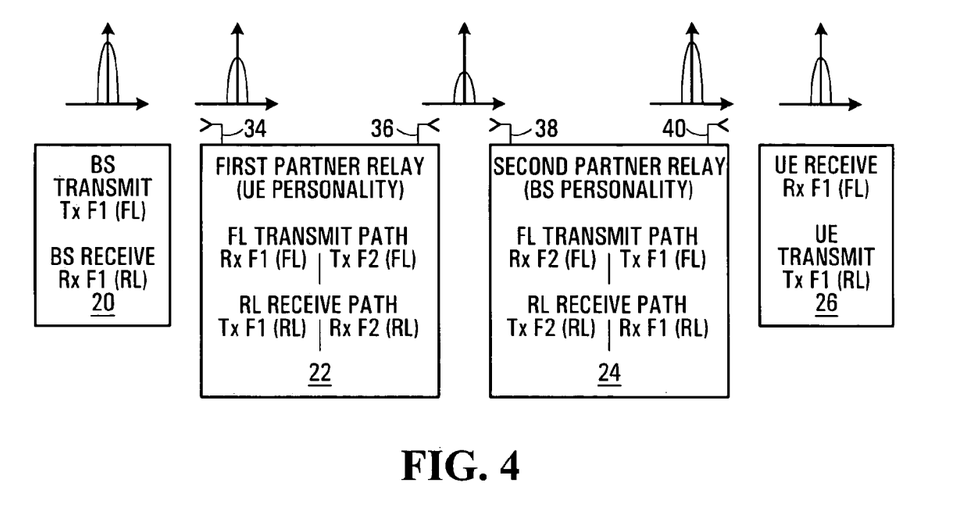
FIG. 4 is a block diagram of a second analog relay scheme with partner relays provided by an embodiment of the invention.

Referring now to FIG. 4, shown is another example of the partner relaying concept provided by another embodiment of the invention. In this example, it is assumed F1 (FL) and F1 (RL) are two FDD frequencies on a single carrier having carrier frequency F1. Here, it is assumed that there is an additional frequency F2 which is available for communication between the partner relays. This may for example be an additional carrier within the system which has not been implemented. At the first partner analog relay 22, the forward link frequency F1 (FL) on first carrier F1 is translated to the forward link frequency F2 (FL) on a second carrier F2. Preferably, gain control is used to reduce the amplitude of the signal on F2 so as to minimize inter-cell interference created, and to further allow the use of F2 in adjacent cells. Since F1 (FL) and F2 (FL) are well separated in frequency, the isolation between the transmit and receive antennas is limited only by the noise floor. Preferably it is low enough so as not to desensitize the receiver. Preferably, a highly directional antenna then beams the F2 (FL) carrier to the second partner relay 24. The second partner relay 24 receives F2 (FL), again preferably on a highly directional antenna, amplifies the signal and retransmits it on F1 (FL) to the UE 26. The UE then receives a stronger signal on F1 (FL) than it would without the presence of the relays. Similarly, F2 (RL) on the second carrier F2 is used to carry the RL (F1) signal between the two relays 24, 22 on the uplink.

It can be seen that the partner relays work in pairs, taking on the UE and BS personality in terms of the transmit and receive channels. In this case, a spare frequency F2 is used for communication between the partner relays. Relay to relay transmissions are preferably low power, highly directional, and employ orthogonally polarized antennas.

It is also noted that the UE and/or BS may combine signals received directly (i.e. not via the relay) with the signals received via the relay as a multi-path to improve gain in the system.

The example of FIG. 4 is particularly appropriate for CDMA wireless communication systems in which an operator may have a spare carrier available for use for communicating between the partner relays.

For example, it might be assumed that the capacity demand of the cell whose coverage is to be improved only requires that F1 be deployed in the cell, and that as such F2 is available as a spare frequency that can be used to extend coverage.

In a preferred embodiment, one of the two relays in a given relay pair is located in such a manner as to enhance uplink communication (e.g., on a lamp-post), and the other of the two relays of a given pair is located so as to enhance downlink communications (e.g., on a building roof, within line-of-sight of the BS). The two partner relays are preferably positioned to be within line-of-sight of each other. Thus, in contrast to a single relay system in which a compromise has to be made in the location of a single relay, in a partner relay scheme the two relays can be located independently so as to provide enhanced communications both on the uplink and downlink.

In the example of FIG. 4, there are in fact four different frequencies employed, namely F1 (FL), F2 (FL), F1 (RL), and F2 (RL). In the CDMA example, this requires a separate carrier to be available for use for communicating between the relays.

In another embodiment, the relaying scheme is employed in a system in which there are only two frequencies available overall. For example, in a CDMA system in which there is only one carrier, or in which there is no spare carrier available, the entire relaying scheme would need to be done using two frequencies, namely the single forward link frequency F1 (FL) and the single reverse link F1 (RL). More generally, the two frequencies may be on a single carrier or two carriers.

Figure 5:
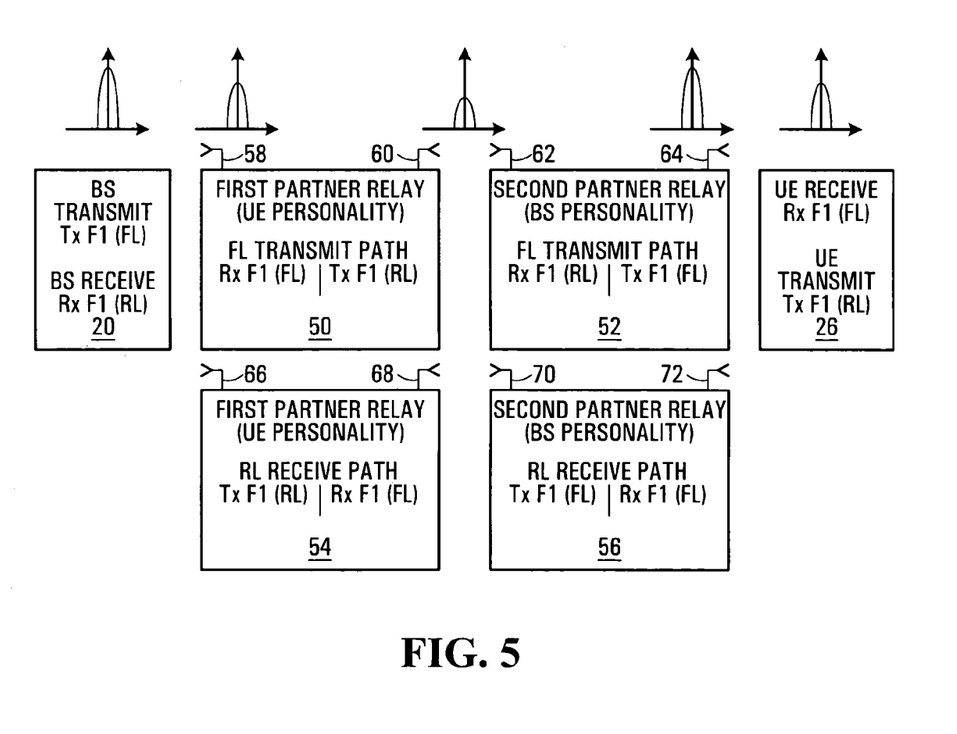
FIG. 5 is a block diagram of a third analog relay scheme with partner relays provided by another embodiment of the invention.

Referring now to FIG. 5, shown is an example relaying scheme in which only two frequencies are employed. Again shown are BS 20 and UE 26 which function the same as in the previous embodiments. Once again, no changes to these components are required. For forward link communications, relay pair 50,52 is employed. Relay 50 receives on antenna 58 on the normal forward link frequency F1 (FL). Relay 50 transmits on antenna 60 on the forward link, but using the normal reverse link frequency F1 (RL). This signal is received at antenna 62 of the second relay 52. The second relay 52 then retransmits the signal on antenna 64 of the original forward link frequency F1 (FL). Thus, communications to and from the relay pair, to and from the base station and the UE employ the standard forward link frequency F1 (FL). However, for the communications between the relay pair 50,52, the reverse link frequency F1 (RL) is employed.

Similarly, for communications on the reverse link between UE 26 and BS 20, a second relay pair 56,54 is shown. Relay 56 receives signals transmitted by UE 26 on the reverse link frequency F1 (RL) via antenna 72. It translates this signal to the forward link frequency F1 (FL) and transmits it on the second antenna 70. Relay 54 then receives this signal on antenna 68, and translates it back to the original reverse link frequency F1 (RL) and then finally transmits this on antenna 66 towards the BS 20.

As in previous embodiments, it is again preferred that the communications between the partner relays employs a polarization which is orthogonal to that used to communicate directly with the BS and UE.

The embodiment of FIG. 5 also shows an example of where the relays are separate for the uplink and the downlink. The downlink communications, there is a relay pair 50,52 both of which can be ideally situated for downlink communications. There is a second relay pair 56,54 which can be ideally situated for uplink communications. In another embodiment, the two relays 50,54 are combined in a single relay device, and the two relays 52,56 are combined in a single relay device as was the case in previous embodiments. Once again, there may be a single antenna or multiple antennas for communicating with the BS, communicating between the relay pair, and communicating with the UE. In this embodiment, given that the frequencies used on the relay transmissions (between the relay pair) are the same frequencies that are being used to communicate directly with the BS and the UE, the polarization of the antennas for the relay communications will help in providing the required isolation. Alternatively, as was shown in the example of FIG. 5, locating the two relays separately will further enhance the isolation. For example, there does need to be some isolation between the signals received on antenna 58 and antenna 68 both of which are on the same frequency, and there needs to be isolation between the signals transmitted on antenna 60 and antenna 66 again both of which are on the same frequency. By separating the forward relay 50 and the reverse relay 54, this will reduce the impact of interference by relay transmissions.

Figure 6A:
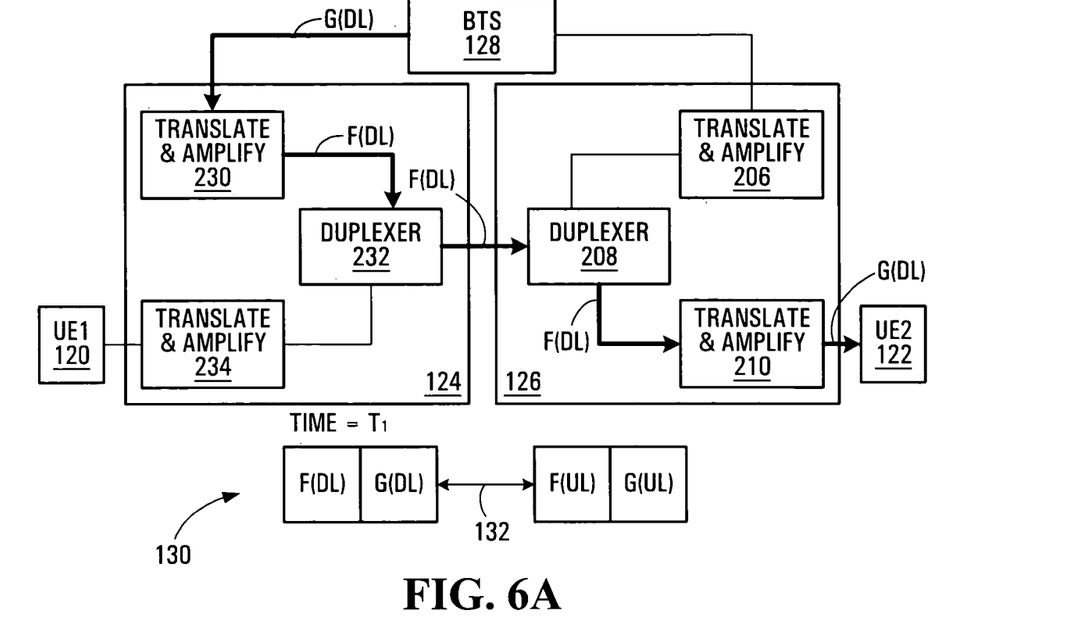
FIGS. 6A through 6G are block diagrams of analog relay schemes with partner relays provided by embodiments of the invention.

Referring now to FIG. 6A, shown is another partner relaying system appropriate again in a context in which there is no spare frequency available. In this embodiment, the forward link (also referred to as downlink or DL) transmission resource has two components, referred to here as F (DL) and G (DL). In some embodiments, F(DL) and G (DL) are FDD resources on a single carrier. In another embodiment F (DL) and G (DL) are different CDMA transmission resources. In yet another embodiment appropriate for GSM, which is a FDM/TDMA system, there are a number of frequencies (several 200 KHz channels over 10 MHz, e.g., 905-915 MHz and 950-960 MHz) available for multiple users, and a subset of which can be used for relaying between partners. Similarly, on the reverse link (also referred to as uplink or UL), the frequencies used are F (UL) and G (UL).

This embodiment shows a first transceiver 120 and a second transceiver 122 each communicating with a base station 128. To achieve this, a pair of partner relays 124,126 are employed. Each partner relay has the functionality described in more detail below with reference to FIG. 7.

In this embodiment, F (DL) might for example consist of a first set of F channel consisting of channels $f_1, f_2, \ldots$ and G (DL) might consist of a second set of G channels, consisting of channels $g_1, g_2, \ldots$ A similar channel breakdown may be implemented for F (UL) and G (UL). More generally, any appropriate transmission resources may be employed for these four types communications. The "F" resources, F (DL) and F (UL) are used to communicate with the first UE 120, and the "G" resources are used to communicate with the second UE 122. In this particular example, there is only a single user for F resources and a single user for G resources. In another embodiment, multiple users are serviced using the F resources and multiple users are serviced using the G resources.

Typically, for FDD systems, the uplink and downlink transmission resources are separated. For example, there might be a 40 MHz separation between the UL and DL frequencies. An example frequency plan is indicated at 130, where the downlink resources F (DL) and G (DL) are consecutive, followed by a space 132, and then the uplink resources F (UL) and G (UL).

Figure 7:
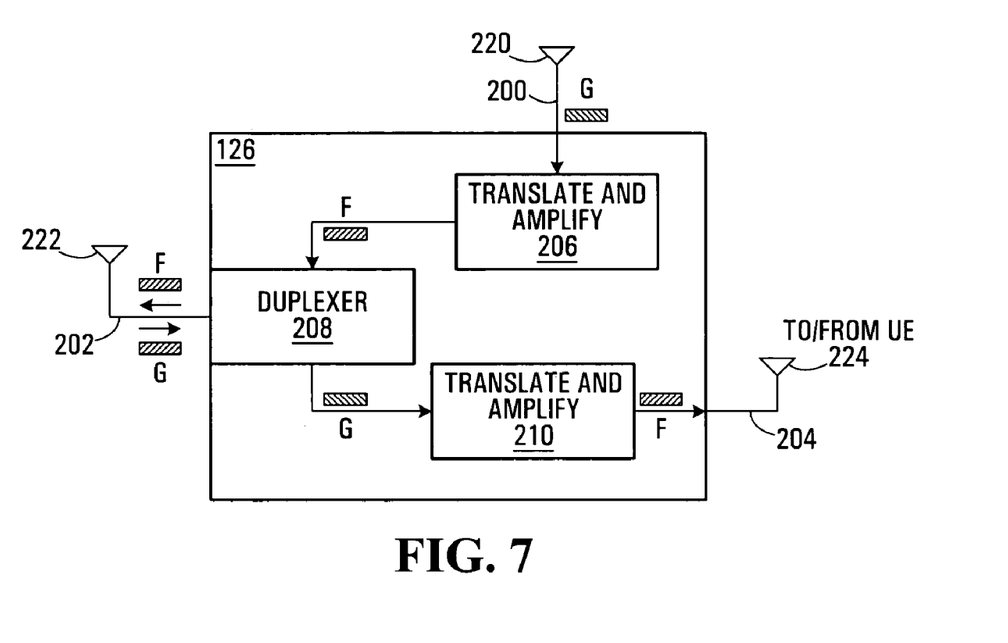
FIG. 7 is a block diagram of an example implementation of a relay.

Referring now to FIG. 7 which shows the details of relay 126, for this embodiment, each relay 124, 126 has three antennas 220,222,224. There is a first antenna 220, preferably a directional antenna (or smart array antenna) which is directed towards the base-station, such as base station 128 of FIG. 6A. There is a second directional antenna 222 (or smart antenna array) pointing towards the partner relay. Finally, there is a third antenna 224 which may be directive or non-directive, directed towards a UE such as the UE 122 in the example of FIG. 6A. In preferred implementations, the two directional antennas of a given relay which point towards the other relay and the base station respectively have beam patterns with minimal overlap to minimize interference. The relay 126 has a first translate and amplify function 206 for communicating to/from a base station on wireless link 200 via antenna 220; a second translate and amplify function 210 for communicating to/from a UE on wireless link 204 via antenna 224; a duplexer 208 for communicating to/from the other relay in the relay pair on wireless link 202 via antenna 222. The details of the first relay 124 are similar and will not be elaborated upon further.

Depending upon how the transmission resources are assigned, and on how the duplexers are configured, the arrangement of FIG. 6A can be employed in many different ways. For example, in some embodiments, relays are employed which are capable of switching the roles of the transmit and receive bands. An example of such a relay is described in Applicants' copending application Ser. No. 10/736,699 entitled "Method and Apparatus of Fixed Relay Multiplex and Duplexer" filed Dec. 17, 2003, hereby incorporated by reference in its entirety. A specific set of examples will now be described with further reference to FIG. 6A, and with reference to FIGS. 6B through 6F.

Referring first to FIG. 6A, active communications links for this example are in bold. The BTS 128 is shown communicating with UE 122 using a path BTS 128→relay 124→relay 126→UE 122. To achieve this, BTS 128 transmits using G (DL), which is the transmission resource expected by the UE 122. The translate and amplify function 230 of the first relay translates this to F (DL) and passes this to the duplexer 232 which transmits this towards the second relay 126. The second relay 126 duplexer 208 receives the F (DL) signal, and passes this towards the translate and amplify function 210, which translates this back to G (DL) and transmits this towards the UE 122.

Figure 6B:
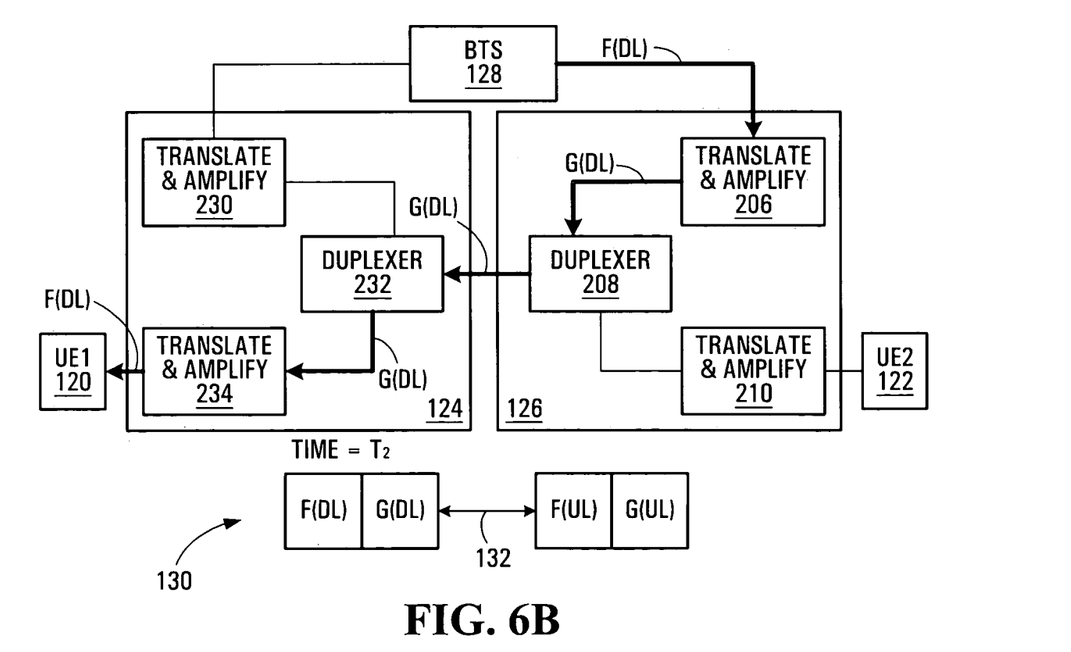

Referring next to FIG. 6B, the BTS 128 is shown communicating with UE 120 using a path BTS 128→relay 126→relay 124→UE 120. To achieve this, BTS 128 transmits using F (DL), which is the transmission resource expected by the UE 120. The translate and amplify function 206 of the second relay 126 translates this to G (DL) and passes this to the duplexer 208 which transmits this towards the first relay 124. The first relay 124 duplexer 232 receives the G (DL) signal, and passes this towards the translate and amplify function 234, which translates this back to F (DL) and transmits this towards the UE 120.

Figure 6C:
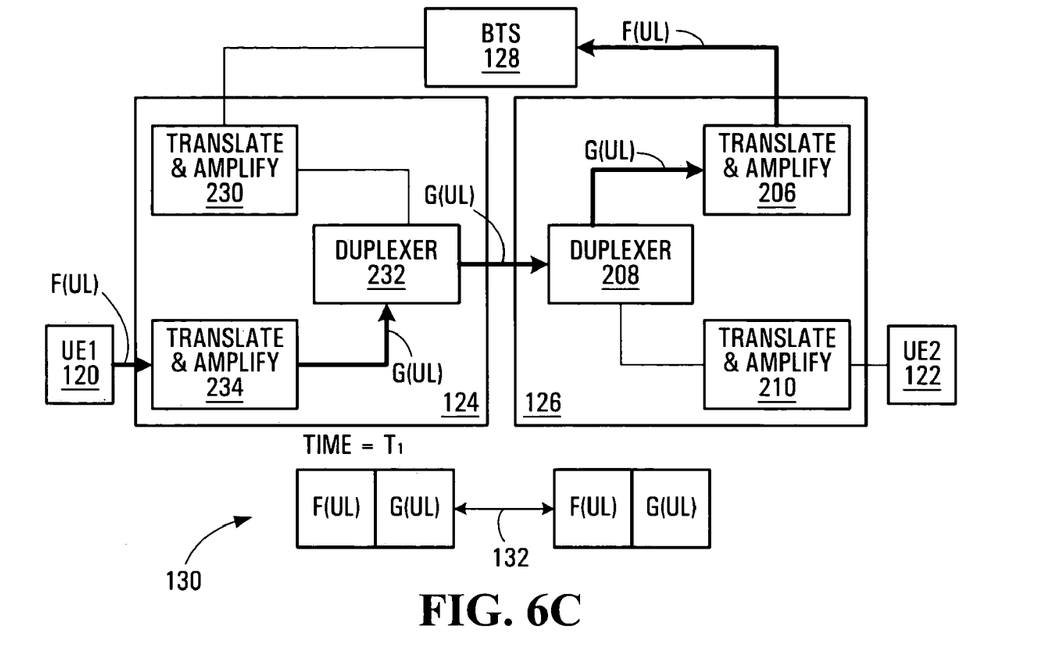

Referring next to FIG. 6C, the UE 120 is shown communicating with BTS 128 using a path UE 120→relay 124→relay 126→BTS 128. To achieve this, UE 120 transmits using F (UL), which is the transmission resource allocated to UE 120. The translate and amplify function 234 of the first relay 124 translates this to G (UL) and passes this to the duplexer 232 which transmits this towards the second relay 126. The second relay 126 duplexer 208 receives the G (UL) signal, and passes this towards the translate and amplify function 206, which translates this back to F (UL) and transmits this towards the BTS 128.

Figure 6D:
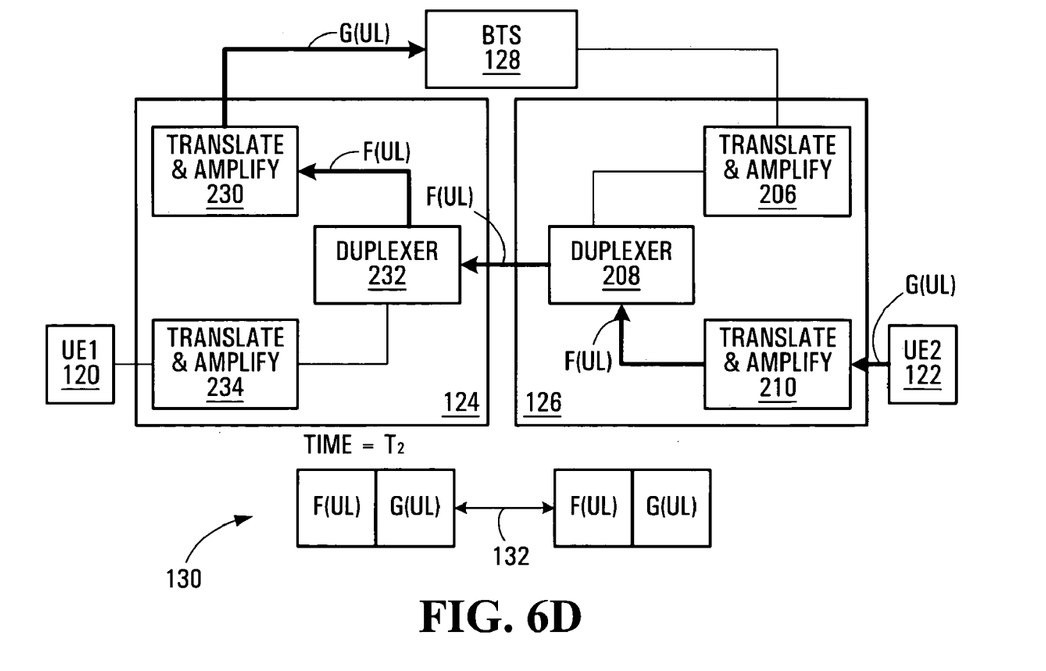

Referring next to FIG. 6D, the UE 122 is shown communicating with BTS 128 using a path UE 122→relay 126→relay 124→BTS 128. To achieve this, UE 122 transmits using G (UL), which is the transmission resource allocated to UE 122. The translate and amplify function 210 of the second relay 126 translates this to F (UL) and passes this to the duplexer 208 which transmits this towards the first relay 124. The first relay 124 duplexer 232 receives the F (UL) signal, and passes this towards the translate and amplify function 230, which translates this back to G (UL) and transmits this towards the BTS 128.

Figure 6E:
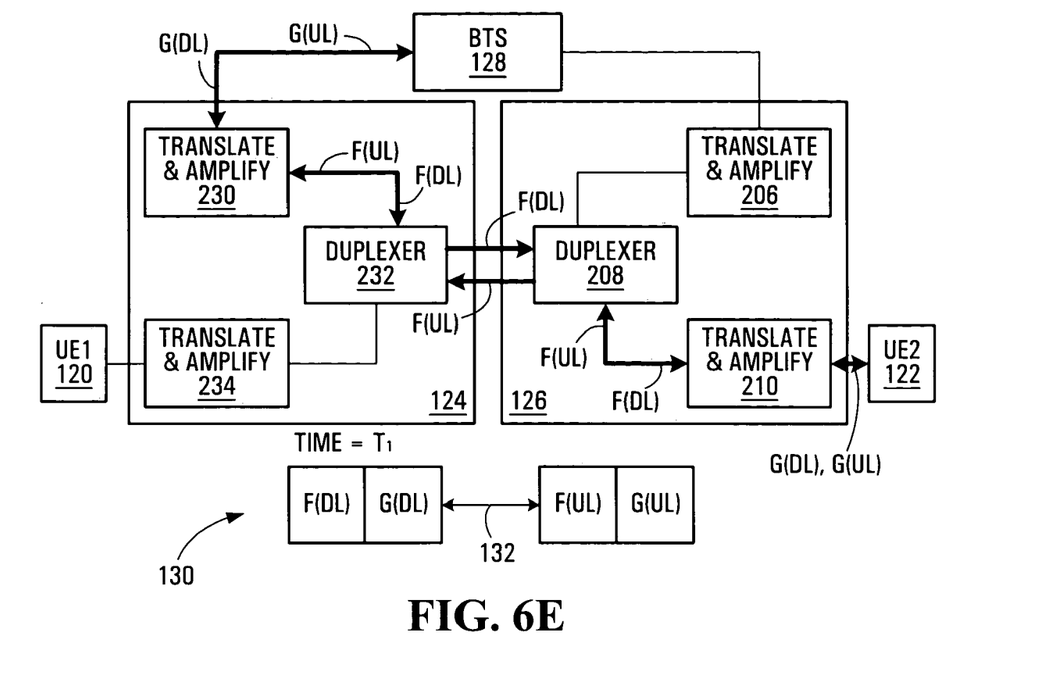
Figure 6F:
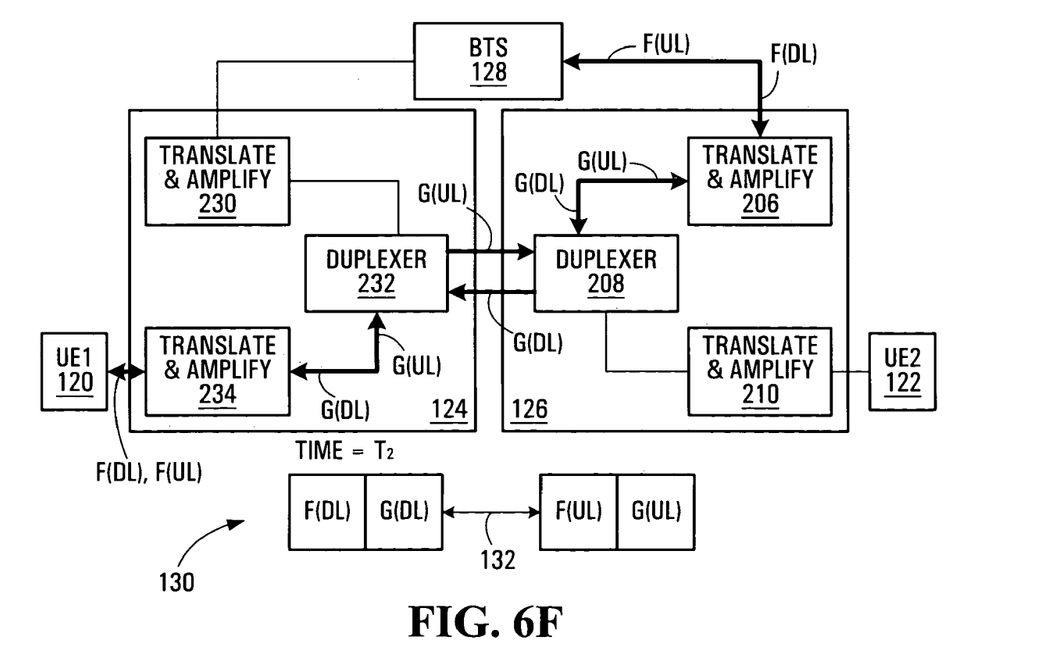

In some embodiments, the functionality of all of FIGS. 6A, 6B, 6C, 6D is delivered using a slotted transmission scheme. During slots of a first type, the signals of FIGS. 6A and 6D are transmitted, as illustrated in FIG. 6E. During slots of a second type, the signals of FIGS. 6B and 6D are transmitted as illustrated in FIG. 6F. In this embodiment, the duplexer bands are switched each slot. It can be seen for example that in FIG. 6E, relay 124 is transmitting on the downlink band and receiving on the uplink band whereas in FIG. 6F, relay 124 is transmitting on the uplink band and receiving on the downlink band. A similar situation exists for relay 126. This dual function relay can be implemented in any suitable manner, for example by including multiple transceiver paths, or by implementing the switched solution described in the above-referenced incorporated application.

Figure 6G:
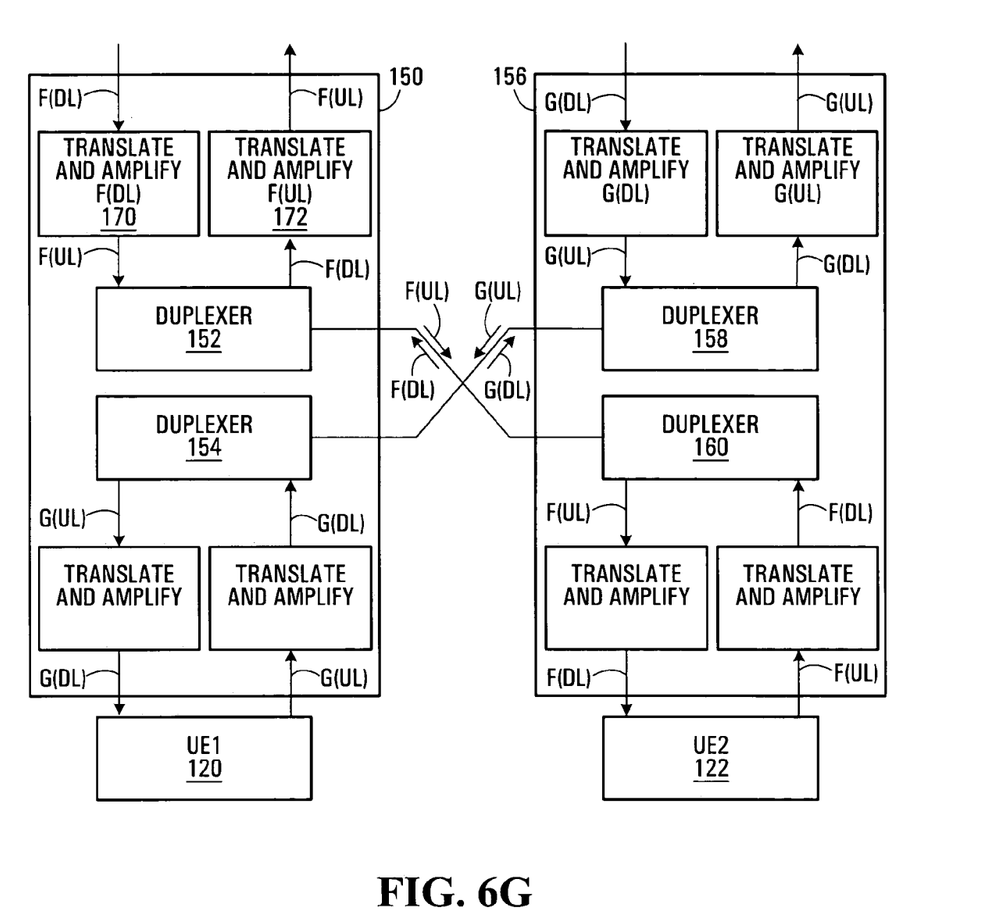

Another example implementation is shown in FIG. 6G where a first relay 150 has a pair of duplexers 152,154 for implementing the two different relay functions, and similarly, a second relay 156 has a pair of duplexers 158,160 for implementing the two different relay functions. The remainder of FIG. 6G is substantially similar to previous embodiments, although each translate and amplify function is shown split into two. For example, duplexer 152 is connected to a first translate and amplify function 170 for translating F (DL) to F (UL) for the downlink, and is connected to a second translate and amplify function 172 for translating F (DL) to F (UL) for the uplink.

In this example, effectively a separate relay pair is provided for forward link transmission, and a separate relay pair is provided for reverse link transmission. In the illustrated example, these have been combined into two relays 150,152, but they could be implemented separately.

In preferred embodiments, the relays implement a simple analog relaying function by performing a simple frequency translation operation. In some embodiments, the relaying is extended to include analog time-slot translation. This involves the additional complexity of analog to digital conversion, digital delay, and digital to analog conversion in the relay. Once again, there would not be the requirement for any changes in the base station or the user equipment assuming they are adapted to work in a slotted environment. The delay caused by the additional processing is preferably small enough to not impact the UE's reception of the signal. In this case, the delay may be long enough to not allow spatial diversity combining, unless the soft decision bits from the BS transmission are stored in a buffer and then combined with the relay transmission.

In one example implementation, it is assumed that the signals being transmitted between the various components are CDMA signals. With CDMA, services are typically provided by one or more carriers (F1, F2). In the event there is an extra carrier (F2) which is not being employed within a given service area, that carrier can then be made available for the above-described relay function. In some CDMA implementations, a given set of users occupies a 1.25 MHz bandwidth. There is typically no capability to selectively amplify sub-channels within a CDMA signal, however this could be done but at a substantial increase in complexity. Thus, for CDMA embodiments, it is preferred that the entire 1.25 MHz bandwidth be translated to the new carrier for transmission between the partner relays.

In some evolving CDMA applications however (e.g., 1XEV-DO, HSPDA), there is a time-slotted channel, typically used for higher speed data transmission. In the event a separate time-slotted CDMA channel is available, in some embodiments the slotted channel is selectively relayed only. Again, as with GSM, the BS can combine all transmissions to be relayed over a portion of the time slots/frame, and require that only the selected time units be relayed. This may require synchronization between the BS and relay (relay may need to have GPS).

As indicated previously, some embodiments of the invention can be applied to the GSM (Global System for Mobile Communications) system. In GSM, there are a larger number of frequency channels, each 200 KHz in width, and each channel is also time-slotted with seven slots per frame. In a preferred application of the invention the GSM, all of the signals that require relay functionality can be arranged to be transmitted together on a single (or multiple if required) frequency channel. In that way, a simple translation of that entire frequency band can be performed in a relay.

For the GSM application, the frequency used for the relay signal can be any frequency channel available to GSM which is not currently being used to transmit signals directly between the BS and UE. In some embodiments, it may be advantageous to allow the frequency band or bands being employed for relay functionality to hop around within the GSM bandwidth.

In a preferred implementation, the system (e.g., BS) defines either statically or adaptively channels within the set of available frequency channels which are observed to have very low interference within the entire cell. Such channels are particularly well-suited for use in a relay band. In some embodiments, within each frequency carrier only particular time slots are relayed. For example, given that the control channel is transmitting using 4 QAM and is usually acceptably received throughout the entire cell, in a preferred embodiment the control channel is not relayed. This reduces the introduction of additional interference within the cell and the associated decrease in overall system capacity which would otherwise result. Similarly, if there are one or more users of the six data slots in a given frequency carrier which is experiencing acceptable performance, it is preferable that those time slots are not relayed by the partner relays. In a preferred embodiment, information identifying which data slots to relay is included within a signalling channel. For example, the existing control channel for GSM may be modified to include additional information. This may require modification to the standards which govern the content of this control channel. Then, for a given set of one control channel supporting multiple data slots, the control channel can indicate which of the data slots needs to be relayed by the partner relays. Again, by selectively re-transmitting only particular slots, the amount of interference introduced within the cell is reduced.

The above-discussed example employing GSM is an example of a TDMA based system in a sense that transmissions are slotted in time. The GSM example includes a series of frequency channels which are used for multiple users transmissions. The particular frequency channels and slot structures of GSM are but one example of a multi-channel TDM based system within which an embodiment of the invention may be employed. Other channel and slot arrangements may alternatively be employed.

In another embodiment, a TDMA transmission employed with a single frequency channel (or carrier) scheme is for the main BS to UE transmission. In other words, the frequency breakdown is the same as that described for the first example implementation of FIG. 2. However, in this example, a TDMA transmission scheme is overlaid on top of that single frequency. The relaying schemes discussed above with respect to FIGS. 2, 3 and 4 can be employed in this context as well. However, in preferred embodiments only particular time slots are subject to relaying by the partner relays. Once again, this minimizes the amount of interference within the cell. In a TDMA transmission scheme featuring a control slot, as was the case in the GSM example above, it is preferred that the control slot be used to transmit an identification of which time slots should be subject to relaying by the relay pair.

While the application of the analog on-channel partner relaying concept is not illustrated for OFDM systems, it is equally feasible to apply the concept to a system with multiple OFDM carriers (as with CDMA carriers). The OFDM system's signals can also be selectively amplified either in the time domain or in the frequency domain with amplification of specific subcarrier channels.

The concept of partner relaying can be further applied to digital on-channel relays, where the received information is first converted to baseband and the signal retransmitted on the same frequency channel.

Numerous modifications and variations of the present invention are possible in light of the above teachings. It is therefore to be understood that within the scope of the appended claims, the invention may be practised otherwise than as specifically described herein.

We claim:

1. A partner relay system for use in a communication system comprising a first transceiver and at least one second transceiver in which forward link transmissions occur in a downlink direction from the first transceiver to the at least one second transceiver and reverse link transmissions occur in an uplink direction from the at least one second transceiver to the first transceiver, the partner relay system comprising:
   a first relay adapted to receive a first signal in the downlink direction on a first wireless transmission resource, perform a first signal translation on the first signal to a second transmission resource, and re-transmit the first signal in the downlink direction on the second wireless transmission resource;
   a second relay in a spaced arrangement from said first relay adapted to receive the first signal in the downlink direction on the second wireless transmission resource from the first relay, perform a second signal translation to re-translate the first signal to the first wireless transmission resource, and re-transmit the first signal in the downlink direction;
   wherein the first wireless transmission resource is a transmission resource allocated for forward link transmissions from the first transceiver, and the second wireless transmission resource is a transmission resource allocated for reverse link transmissions to the first transceiver.

2. A partner relay system according to claim 1 wherein each signal translation is an analog translation.

3. A. partner relay system according to claim 2 wherein each signal translation is a frequency translation.

4. A partner relay system according to claim 1 wherein the first signal is a CDMA signal.

5. A cellular communication system for servicing a wireless station, the cellular communication system comprising a base station and the partner relay system of claim 1;
wherein the first signal is transmitted by the base station, and the second relay re-transmits the first signal for reception by the wireless station.

6. A partner relay system according to claim 1 wherein the first wireless transmission resource comprises a first combined TDM/FDM resource, and the second wireless transmission resource comprises a second combined TDM/FDM resource.

7. A partner relay system according to claim 1 for use in a cellular communications system providing service to a wireless station, wherein the first relay comprises a first antenna for communicating with the cellular communications system, and a second directional antenna for communicating with the second relay, and wherein the second relay comprises a third directional antenna for communicating with the first relay, and a fourth antenna for communicating with the wireless station.

8. A partner relay system according to claim 1 wherein:
the second relay is further adapted to receive a second signal in the uplink direction on a third wireless transmission resource, perform a third signal translation to translate the second signal to a fourth wireless transmission resource and re-transmit the second signal in the uplink direction;
the first relay is further adapted to receive the second signal in the uplink direction on the fourth wireless transmission resource from the second relay, perform a fourth signal translation to re-translate the second signal to the third wireless transmission resource, and re-transmit the second signal in the uplink direction;
wherein the third wireless transmission resource is a transmission resource allocated for reverse link transmissions to the first transceiver and the fourth wireless transmission resource is a transmission resource allocated for forward link transmissions from the first transceiver.

9. A partner relay system according to claim 8 wherein the first wireless transmission resource comprises a first combined TDM/FDM resource, and the second wireless transmission resource comprises a second combined TDM/FDM resource, the third wireless transmission resource comprises a third combined TDM/FDM resource, and the fourth wireless transmission resource comprises a fourth combined TDM/FDM resource.

10. A partner relay system according to claim 1 further comprising:
a third relay adapted to receive a second signal on a third wireless transmission resource, perform a third signal translation to translate the second signal to a fourth wireless transmission resource and re-transmit the second signal;
a fourth relay further adapted to receive the second signal on the fourth wireless transmission resource from the third relay, perform a fourth signal translation to re-translate the second signal to the third wireless transmission resource, and re-transmit the second signal.

11. A partner relay system according to claim 10 wherein the first wireless transmission resource comprises a first combined TDM/FDM resource, and the second wireless transmission resource comprises a second combined TDM/FDM resource, the third wireless transmission resource comprises a third combined TDM/FDM resource, and the fourth wireless transmission resource comprises a fourth combined TDM/FDM resource.

12. A partner relay system according to claim 1 further comprising:
a third relay adapted to receive a second signal on the second wireless transmission resource, perform a third signal translation to translate the second signal to the first wireless transmission resource and re-transmit the second signal;
a fourth relay adapted to receive the second signal on the first wireless transmission resource from the third relay, perform a fourth signal translation to re-translate the second signal to the second wireless transmission resource, and re-transmit the second signal.

13. A method of relaying a signal in a communication system comprising a first transceiver and at least one second transceiver in which forward link transmissions occur in a downlink direction from the first transceiver to the at least one second transceiver and reverse link transmissions occur in an uplink direction from the at least one second transceiver to the first transceiver, the method comprising:
receiving a first signal in the downlink direction on a first wireless transmission resource;
performing a first signal translation on the first signal to a second transmission resource and re-transmitting the first signal on the second Wireless transmission resource in the downlink direction;
receiving the first signal in the downlink direction on the second wireless transmission resource;
performing a second signal translation to re-translate the first signal to the first wireless transmission resource and re-transmitting the first signal in the downlink direction;
wherein the first wireless transmission resource is a transmission resource allocated for forward link transmissions from the first transceiver, and the second wireless transmission resource is a transmission resource allocated for reverse link transmissions to the first transceiver.

14. A method according to claim 13 further comprising:
receiving a second signal in the uplink direction on a third wireless transmission resource;
performing a third signal translation to translate the second signal to a fourth wireless transmission resource and re-transmitting the second signal in the uplink direction;
receiving the second signal in the uplink direction on the fourth wireless transmission resource;
performing a fourth signal translation to re-translate the second signal to the third wireless transmission resource and re-transmit the second signal in the uplink direction
wherein the third wireless transmission resource is a transmission resource allocated for reverse link transmissions to the first transceiver and the fourth wireless transmission resource is a transmission resource allocated for forward link transmissions from the first transceiver.

* * * * *